United States Patent
Bastiaansen

(10) Patent No.: US 11,254,411 B2
(45) Date of Patent: Feb. 22, 2022

(54) AIRFOIL-SHAPED BODY WITH A VARIABLE OUTER SHAPE

(71) Applicant: FOKKER AEROSTRUCTURES B.V., Papendrecht (NL)

(72) Inventor: Adrianus Marinus Franciscus Bastiaansen, Breada (NL)

(73) Assignee: FOKKER AEROSTRUCTURES B.V., Papendrecht (NL)

(*) Notice: Subject to any disclaimer, the term of this patent is extended or adjusted under 35 U.S.C. 154(b) by 185 days.

(21) Appl. No.: 16/492,905

(22) PCT Filed: Mar. 16, 2018

(86) PCT No.: PCT/NL2018/050168
§ 371 (c)(1),
(2) Date: Sep. 10, 2019

(87) PCT Pub. No.: WO2018/169403
PCT Pub. Date: Sep. 20, 2018

(65) Prior Publication Data
US 2021/0139128 A1    May 13, 2021

(30) Foreign Application Priority Data
Mar. 17, 2017 (NL) ........................ 2018538

(51) Int. Cl.
*B64C 3/48* (2006.01)
*B64C 3/26* (2006.01)
(52) U.S. Cl.
CPC . *B64C 3/48* (2013.01); *B64C 3/26* (2013.01)
(58) Field of Classification Search
CPC .... B64C 3/48; B64C 3/26; B64C 3/44; B64C 2003/142
See application file for complete search history.

(56) References Cited

U.S. PATENT DOCUMENTS

| 4,230,295 A | 10/1980 | Eppler |
| 5,367,970 A | 11/1994 | Beauchamp et al. |

(Continued)

FOREIGN PATENT DOCUMENTS

DE    10001700    7/2001

OTHER PUBLICATIONS

International Search Report for PCT/NL2018/050168, dated May 29, 2018.
Written Opinion for PCT/NL2018/050168, dated May 29, 2018.

*Primary Examiner* — Rodney A Bonnette
(74) *Attorney, Agent, or Firm* — Nixon Peabody LLP; Jeffrey L. Costellia

(57) ABSTRACT

An airfoil-shaped body having a variable outer shape, comprising: a first skin, defining a suction surface, a second skin, defining a pressure surface and connected to the first skin at least at a leading edge and/or a trailing edge of the airfoil-shaped body, at least one elongate stiffening beam, arranged inside a cavity of the airfoil-shaped body and secured to at least one of said first and second skins, the stiffening beam including at least a first and a second beam section arranged one after the other and a joining member, arranged between end portions of the beam sections and connected thereto, said joining member being adapted to allow relative movement between the beam sections by an elastic deformation; and an actuator that is operationally associated with said elongate stiffening beam, wherein, upon operating the actuator, the first beam section is moved with respect to the second beam section, or vice versa, changing the orientation of the beam sections with respect to each other, which causes a change in the variable outer shape of the airfoil-shaped body.

20 Claims, 7 Drawing Sheets

(56) References Cited

U.S. PATENT DOCUMENTS

| | | | |
|---|---|---|---|
| 6,138,956 A | 10/2000 | Monner | |
| 6,145,791 A * | 11/2000 | Diller | B64C 3/48 244/130 |
| 7,931,240 B2 * | 4/2011 | Kothera | B64C 3/54 244/218 |
| 2005/0103945 A1 | 5/2005 | Perez-Sanchez | |
| 2006/0145029 A1 | 7/2006 | Lonsinger | |
| 2011/0042524 A1 | 2/2011 | Hemmelgam et al. | |

* cited by examiner

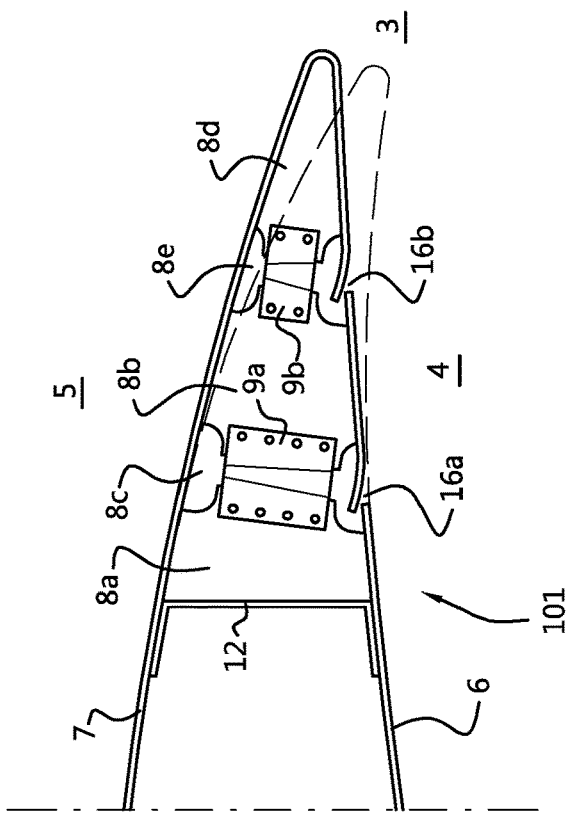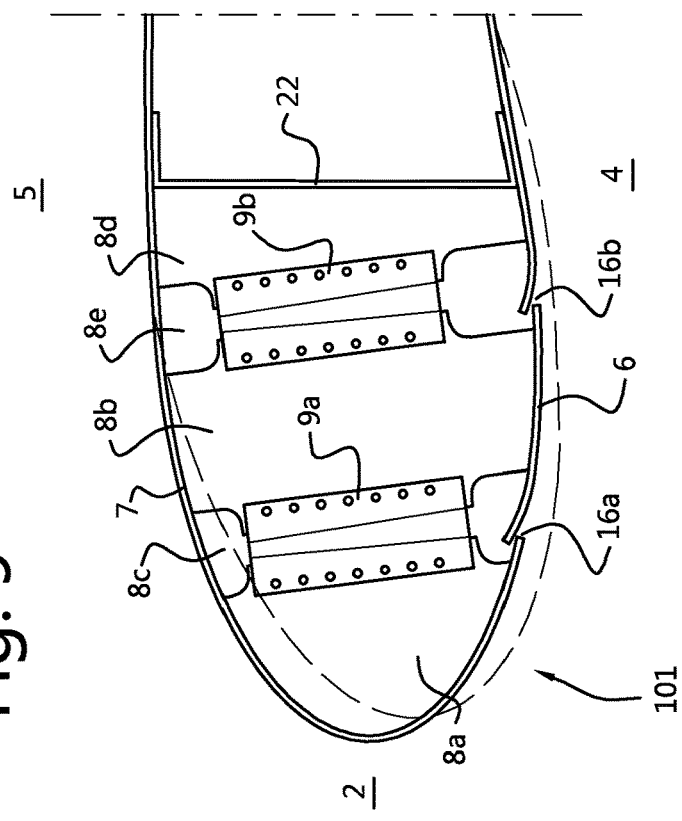

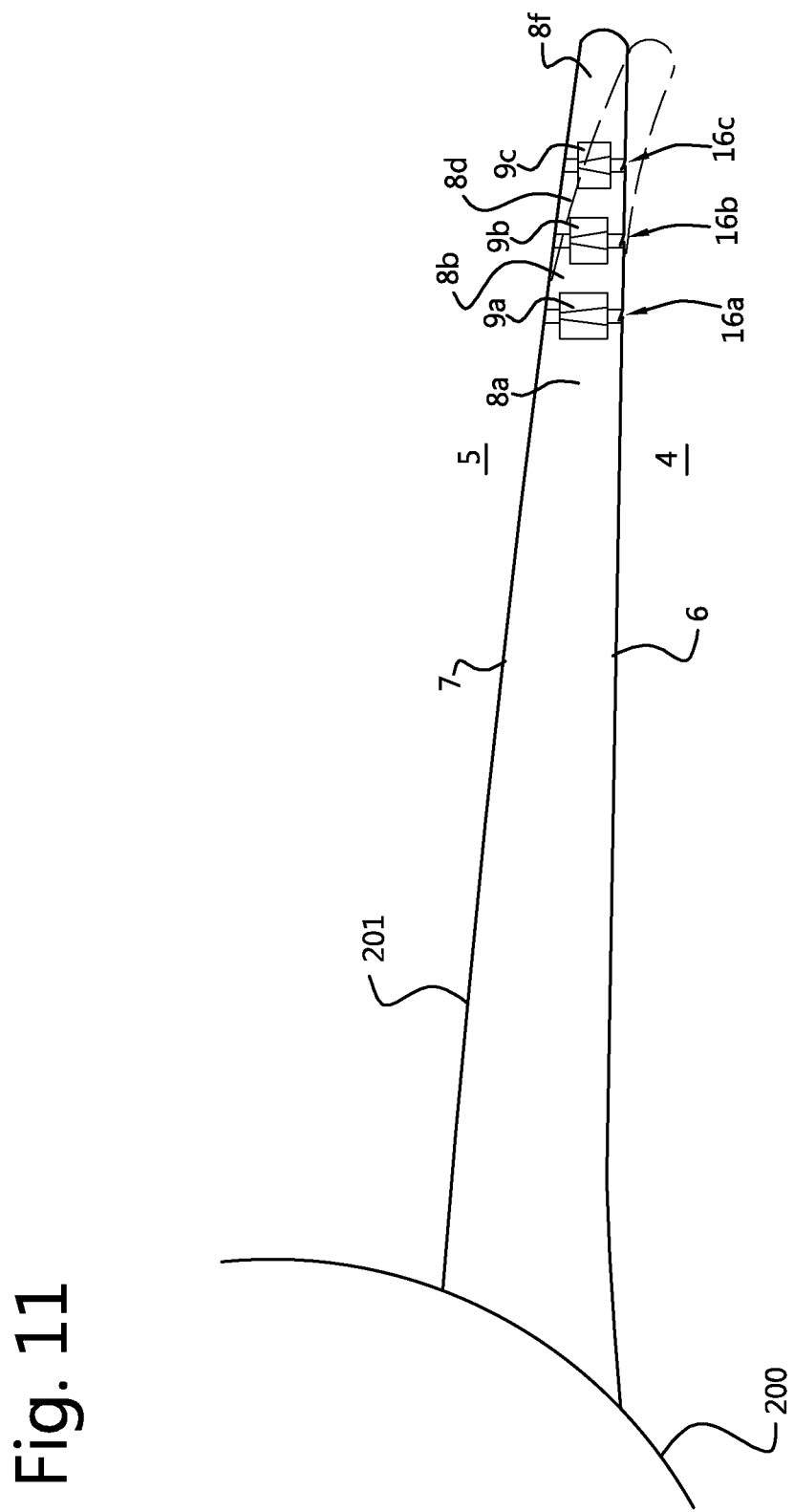

AIRFOIL-SHAPED BODY WITH A VARIABLE OUTER SHAPE

BACKGROUND OF THE INVENTION

1. Field of the Invention

The present invention relates in particular but not exclusively to an airfoil-shaped body having a variable outer shape.

2. Description of the Related Art

An aircraft wing, for example, often has independently movable wing parts, such as, flaps, slats, rudders, elevators, ailerons, spoilers etc. These movable wing parts may e.g. be installed at either the trailing edge or the leading edge of a wing and can be pivoted upwards or downwards with respect to a main, non-deflectable, part of the wing.

One of the disadvantages of such movable wing parts is that they require a relatively heavy, complex and expensive structure. This structure typically has a high part-count and a relatively frequent maintenance interval. On top of that, the local radius of curvature where the main wing adjoins the movable wing part, when said movable wing part is deflected, is usually relatively small. This leads to early separation of the air that flows over the body, and thus leads to lower lift and higher drag. Related to the problem of early separation is the noise induced by this early separation.

To solve at least one of the above problems, the aircraft industry has proposed different concepts of a so-called morphing wing structure: a wing that has a variable outer profile, while having a smooth aerodynamic surface, in particular, while having an uninterrupted upper wing surface. Examples are disclosed in U.S. Pat. Nos. 6,491,262, 7,384,016 and EP 2 423 104.

The invention seeks to provide an alternative airfoil-shaped body with a variable outer profile.

SUMMARY OF THE INVENTION

Therefore, an airfoil-shaped body with a variable outer shape according to claim 1 is presented.

As the invention relates to an airfoil-shaped body, air flows over this body as a result of which a pressure difference is generated between the first skin and the second skin. The first skin is at the side where the relative pressure is low, i.e. the suction side and is also referred to in the art as the upper skin. The second skin is at the side of the body where the relative pressure is high, i.e. the pressure side, and is also referred to in the art as the lower skin. When the airfoil-shaped body is symmetric, for example when the airfoil-shaped body is a vertical tail of an aircraft, what is the first side and what is the second side depends on the angle of sideslip of the airfoil-shaped body with respect to the airflow. Examples of airfoil-shaped bodies are aircraft wings and parts thereof, e.g. spoilers, flaps, slats, rudders, elevators, ailerons, wingtips, winglets, etc., but also wind-turbine blades and parts thereof.

This pressure difference between the first and second skin introduces a distributed load onto the first and second skin. These loads can be up to 20.000 N/m$^2$, or even higher when manoeuvres are made with the airfoil-shaped body, or with a device comprising said body. To be able to cope with this load, the airfoil-shaped body is reinforced at its inner side, with beam sections, such as an elongate stiffening beam. These beam sections carry the load introduced on the skin of the body, at least partially. More than one elongate stiffening beam may be present in the body. For example, multiple ribs may be present in a spanwise direction of an aircraft wing, the different ribs being substantially parallel to each other and arranged in a chordwise direction, for example with a pitch of 150-300 mm in between the ribs. Alternatively, multiple spars may be present along a chordwise direction of an aircraft wing, the different spars being substantially parallel to each other and arranged in a spanwise direction.

The first and second skins together form the outer profile of the airfoil-shaped body, and can for example be connected at a leading edge and/or a trailing edge of the body. Preferably, the outer profile of the airfoil-shaped body is curved, where both the first skin and the second skin have a curvature. By moving the beam sections with respect to each other, this curvature can locally be altered. For example, the trailing edge of an airfoil profile can be pivoted downwards, increasing the curvature of the first skin. Alternatively, the wingtip of a wing can be pivoted upwards or downwards, altering the curvature of the first skin by pivoting the beam sections with respect to each other. The skilled person will understand that, when the curvature of the first skin is altered, also the shape, e.g. the curvature, of the second skin is altered.

The joining element is preferably only connected to the beam sections, and not to a skin. A gap or empty space is then present between the inner side of the skin, the joining element, and the beam sections. This empty space locally reduces the stiffness of the skin, such that this skin, advantageously, can be bent and be varied in shape, making the outer profile of the airfoil-shaped body variable.

The actuator used to change the orientation of the beam section, can be any suitable actuator. The actuator can for example act on the beam sections, pivoting them with respect to each other. This pivoting of the beam sections is allowed by an elastic deformation of the joining member. Alternatively, the actuator can act directly on the joining member, e.g. when this joining member is made of a shape-memory material. Preferably, the load applied by the actuator on the skin, and/or on the joining member, and/or on the stiffening beam is gradual, i.e. spread over a relatively large area.

The beam sections, such as the stiffening beam, according to the invention may extend in different directions within the airfoil-shaped body. In a possible embodiment of the invention, at least one of the beams section, e.g. the elongate stiffening beam, is a rib, arranged in chordwise direction of an aircraft wing. In another or the same embodiment of the invention, at least one of the beams sections, e.g. the elongate stiffening beam, is a spar, arranged in spanwise direction of an aircraft wing.

It is noted that the first of the beam sections is not always associated with the first skin and, analogously, that the second of the beam sections is not always associated with the second skin. In a conceivable embodiment, both the first and second beam section beam are secured to either the first skin, or to the second skin, or both to the first and the second skin. An embodiment is however possible where the first beam section is secured to the first skin and the second beam section to the second skin, or where the first beam section is secured to the second skin and the second beam section to the first skin.

It is noted that the above text mentions a first beam section, a joining member, and a second beam section. It is well conceivable that the first beam section, the joining member, and the second beam section are formed as one piece, forming an elongate beam In below text, the words 'first beam section', 'joining member', and 'second beam section' are used. These words can alternatively be interpreted as 'first beam portion', 'joining portion', and 'second beam portion'.

In a possible embodiment of the invention, the beam sections are arranged in a spanwise direction of the airfoil-shaped body, substantially parallel to each other, and spaced apart from each other in a chordwise direction of the airfoil-shaped body. For example, a longitudinal direction of the joining member, defined by the orientation of the flanges thereof, may be arranged transverse with respect to the longitudinal direction of the beam sections.

In an alternative embodiment of the invention, the two beam sections are arranged one after the other and define an elongate stiffening beam, wherein the joining member is arranged between end portions of the beam sections. For example, the beam sections may be arranged substantially in line, either in a chordwise or in a spanwise direction of the airfoil-shaped body.

In embodiments of the invention, the body comprises multiple spaced apart elongate stiffening beams extending substantially parallel to each other, wherein at least the first beam sections of different stiffening beams are interconnected, or the second beam sections of different stiffening beams are interconnected. For example, when the body is an aircraft wing, multiple ribs of said wing can each comprise at least two rib sections joined together by a joining member. Consecutive ribs, seen in a spanwise direction, are then alternatively connected to the first or the second skin. More specifically, one rib can be secured to the first skin of the wing, while a consecutive rib, seen in a spanwise direction of the wing, is connected to the second skin of the wing. A further consecutive rib is then connected to the first skin of the wing, etc. The most rearward rib sections of the different ribs, that is, the rib sections of the different ribs that are arranged most towards the rear end of the aircraft/wing, are then interconnected, for example with a rod, while the most forward rib sections of the different ribs can also be interconnected, and so can other corresponding rib sections, if present, in between the most forward and most rearward (backward) rib sections. In this embodiment, both the first and second skin are preferably formed in one piece.

In a further alternative embodiment of the invention, the beam sections are arranged substantially perpendicular to each other, one of the two beam sections being arranged in the chordwise direction, the other of the two beam sections being arranged in the spanwise direction.

In a possible embodiment of the invention, the movement of the first beam section with respect to the second beam section includes at least a pivotal movement. The pivot axis defined by the flexible joining member is preferably substantially parallel to the skin of the body, and may for example in an aircraft wing extend in chordwise or spanwise direction; transverse to the orientation of the elongate stiffening beam. The absolute value of the deflection angle of the first beam section with respect to the second beam section, or vice versa, is typically between 1 and 20 degrees, such as between 10 and 15 degrees, where it is conceivable that a continuous range of deflection angles can be achieved with the airfoil-shaped body according to the invention.

It is well conceivable that at least one further, i.e. two or more, joining elements are arranged in an elongate stiffening beam and that the stiffening beam comprises at least one further, i.e. more than two, beam sections, such that the difference in angular orientation between a first and a last beam section can exceed the previously mentioned 20 degrees In a possible embodiment of the invention, the joining member is stiff in a direction from the first to the second skin, e.g. the direction coinciding with the central axis of the joining member. When the airfoil-shaped body for example is an aircraft wing, the first and second skins will be highly loaded in a direction substantially perpendicular to the skin. With the first and second beam sections being spaced apart from each other, e.g. arranged one after the other, there is a gap, e.g. a longitudinal gap, in between the two beam sections. This gap introduces stress concentrations. Therefore, the joining member advantageously is relatively stiff in this direction perpendicular to the first and second skin, allowing it to be loaded in shear and to carry some of the forces acting on the skin. This reduces the stress concentrations around the gap. Although the joining member may be relatively stiff in a direction from the first to the second skin, the joining member is generally less stiff in said direction than the beam sections.

In a possible embodiment of the invention, the first and second beam sections are arranged substantially in line, either in the chordwise direction or in the spanwise direction of the airfoil-shaped body. The beam sections, can be spaced apart from each other, defining a longitudinal gap in between them. The beam sections are described as being arranged "in line" with each other, although the skins to which the beam sections is secured is typically curved, and the "line" along which the beam sections are arranged can be curved.

For example, the beam sections can both be arranged substantially in a chordwise direction of the airfoil-shaped body. Alternatively or simultaneously, the beam sections can both be arranged substantially in a spanwise direction of the airfoil-shaped body.

In a possible embodiment of the invention, the curvature introduced in the first and/or second skin has a radius of at least 150 mm. From an aerodynamic perspective, it is desired when the airflow attaches to the airfoil-shaped body until high angles of attack. This can be achieved by having a gradual variation in the outer shape of the airfoil-shaped body, without kinks, gaps, or sharp edges, and by having a smooth first skin. This can be achieved by having a relatively large radius of curvature of the skin, of more than 150 mm, such as between 250 mm and 500 mm. Most, if not all, known systems to vary the curvature of an airfoil-shaped body, apply a sharper, less gradual variation in the outer shape of the deflected airfoil part, with a smaller radius of curvature. In some known systems, there is even a slit in the first skin to allow a pivotal movement.

In a possible embodiment of the invention, the first, or upper, skin is formed as one piece, resulting in a smooth, aerodynamic, uninterrupted first skin. This is advantageous compared to a regular wing-flap system, where often a gap is present between the main wing and the flap, when the flap is deflected.

In a possible embodiment of the invention, the second, or lower, skin, e.g. in the longitudinal direction of the stiffening beam, is composed of multiple skin parts, the skin parts being spaced apart by a slit and being pivotable with respect to each other, wherein each of said multiple skin parts is secured to one of said first and second beam sections, wherein the multiple skin parts are indirectly connected to each other via the respective beam sections and the joining member, and wherein the slit is arranged in a zone where the joining member is located. Some flexibility is needed in the airfoil-shaped body, to allow its outer shape to vary. In this embodiment, this flexibility is provided by the multiple skin parts, which are allowed to pivot with respect to each other. Therefore, the second and first skins can be connected at the trailing edge.

When the second skin is built up out of multiple skin parts, it is beneficial when the first and second beam sections are secured to the first skin with one side thereof, and secured to a second skin part with another, opposite, side thereof. This indirectly connects the skin parts together and results in a relatively stiff/rigid airfoil-shaped body, that is optimally suited to carry the lift forces of the wing.

In an alternative embodiment of the invention, the second, or lower, skin is formed as one piece. When both the first and second skin are formed as one piece, the body is relatively rigid and it is relatively difficult to vary its shape. Therefore, in an embodiment where both the first and second skins are formed as one piece, it is conceivable that a flexible element is present at the trailing edge of the body, for example an elastomeric element. This element then connects the ends of the first and second skin together, while also providing the required flexibility to make a variation in the outer shape of the body possible. To further increase the flexibility, the beam sections are advantageously secured to only one of the skins, in this embodiment. That is, corresponding first and second beam sections of one stiffening beam are both secured to either the first skin, or to the second skin.

In a possible embodiment of the invention, the first skin is an upper skin of a wing, and the second skin is a lower skin of a wing.

In a possible embodiment of the invention, the joining member comprises a hollow profile with a closed contour. A closed contour gives the joining member stiffness in the direction transverse to the first and second skin, such that the joining member is able to carry lift forces generated by the body. A hollow profile gives the joining member flexibility to deform in the longitudinal direction of the stiffening beams.

In a further embodiment of the invention, the joining member comprises a tubular part with a central axis extending transverse to the longitudinal direction of the beam sections, such as the stiffening beam. The height of the tubular part, defined along the central axis of the tubular part, is then smaller than the vertical distance between the first and second skin, while the diameter of the tubular part is smaller than or substantially equal to the length of a longitudinal gap between the beam sections, measured along the longitudinal direction.

In a further embodiment of the invention, the tubular part has opposite radial attachment flanges which extend outwardly from opposite sides of the tubular part to connect the joining member to the beam sections, the opposite radial attachment flanges defining a longitudinal direction of the joining member. For example, the radial attachment flanges may each be connected to a respective end portion of the first and second beam sections. The beam sections can for example be connected to the joining member with an adhesive material, with rivets, or they may be welded together. More specifically, the joining member and the beam sections may be connected together with an ultrasonic welding method.

In this embodiment, the tubular part of the joining member can for example have a conical shape, wherein one end of the tubular part has a larger diameter than the other end of the tubular part.

More specifically, in this embodiment, it can be advantageous if the tubular part is narrower at its end facing the first, upper, skin than at its end facing the second, lower, skin. This is particularly advantageous when the curvature of the first skin is to be increased. In a specific, non-limiting, example a trailing or leading edge of an aircraft wing is adapted to rotate downwards. In this example, this downward rotation is more easily achieved with a tubular part of the joining member that is conically shaped, with the end facing the first skin being narrower than the end facing the second skin.

In one embodiment of the invention, the tubular part of the joining member has a round cross section, such as a circular cross-section or an oval cross-section.

In an alternative embodiment of the invention, the tubular part has a polygonal cross section, preferably a hexagonal cross section.

In a possible embodiment of the invention, the first skin, in a zone where the joining member is located, has a reduced thickness. A reduced thickness of the first skin in said zone makes it more easy to deform the shape of the first skin, and thus more easy to vary the outer shape of the body.

In a possible embodiment of the invention, the joining member is made from a thermoplastic composite fiber material. A thermoplastic material is preferred over a thermoset material, as the latter material is tougher and repeatedly changing the shape of a thermoset material causes more damage to the material compared to repeatedly changing the shape of a thermoset material. However, it is possible to make the joining member of a thermoset composite fiber material. The advantage of using a composite fiber material is that these materials, in general, are not susceptible to fatigue, in contrast to for example metals. However, any material not susceptible to fatigue may be used, such as thermoplastic fiber material, thermoset fiber material, metals, or any other type of material.

In a possible embodiment of the invention, the beam sections are made of a thermoplastic or thermoset composite fiber material. This is particularly advantageous when the joining member is also made of a composite fiber material, such as a thermoplastic composite fiber material. The two parts can then easily be connected together during the manufacturing process of the parts, for example via ultrasonic welding, resulting in a secure, strong, and relatively cheap connection between the beam sections and the joining member.

In a possible embodiment of the invention, when both the joining member and the beam sections are made from a composite fiber material, the composite fiber material of the joining member contains fibres which are shorter than the fibres of the composite fiber material of the associated beam sections. This ensures that the joining member is relatively flexible compared to the beam sections, such that only the joining member is elastically deformed when the actuator is activated.

In a further embodiment of the invention, the joining member is a compression or injection moulded part, wherein, preferably, a material with relatively short fibers is injected in a mould.

In alternative embodiments of the invention, the joining member is at least partially made of titanium, e.g. via an additive manufacturing process.

In a further embodiment of the invention, at least the beam sections and the joining member are formed as one piece, e.g. forming an elongate beam section comprising a first beam portion, a joining portion, and a second beam portion.

The invention further relates to a joining member having a variable shape, configured to be arranged inside a cavity of a airfoil-shaped body, between at least two beam sections, and to be connected to said two beam sections, said joining member being adapted to allow relative movement between said beam sections by an elastic deformation of said joining member The invention further relates to an aircraft wing or wing part comprising an airfoil-shaped body as described in the above, having a chord direction and a span direction, wherein at least one of the beam sections is a rib extending in the chord direction of the wing. Alternatively the invention also relates to an aircraft wing or wing part comprising an airfoil-shaped body as described in the above having a chord direction and a span direction, wherein at least one of the beam sections is a spar extending in the span direction of the wing.

In the aircraft wing, the variable outer shape of the body may be located near or at a leading edge, and/or a trailing edge.

Also, an aircraft wing generally has a wingtip or winglet. The variable outer shape of the body may be located, additionally or alternatively, near or at the wingtip or winglet of said aircraft wing.

It is noted that the words 'aircraft wing', not only relates to a main wing of an aircraft. In a non-limiting list, also a vertical tail, horizontal tail, and canard are considered to be aircraft wings.

Similarly, a wing part can be any part of a wing, such as a flap, an aileron, an elevator, a winglet, a slat, a rudder, a spoiler, an airbrake, a flaperon, etc.

In a specific embodiment, the airfoil-shaped body according to the invention forms (a part of) a main aircraft wing, a vertical tail of an aircraft, a horizontal tail of an aircraft, a blade of a rotating wing vehicle, or a wind turbine blade. The joining member can then for example be arranged near the leading edge or near the trailing edge of said body.

These and other aspects of the invention will be more readily appreciated as the same becomes better understood by reference to the following detailed description and considered in connection with the accompanying drawings in which like reference symbols designate like parts.

DETAILED DESCRIPTION OF THE FIGURES

Figure 2:
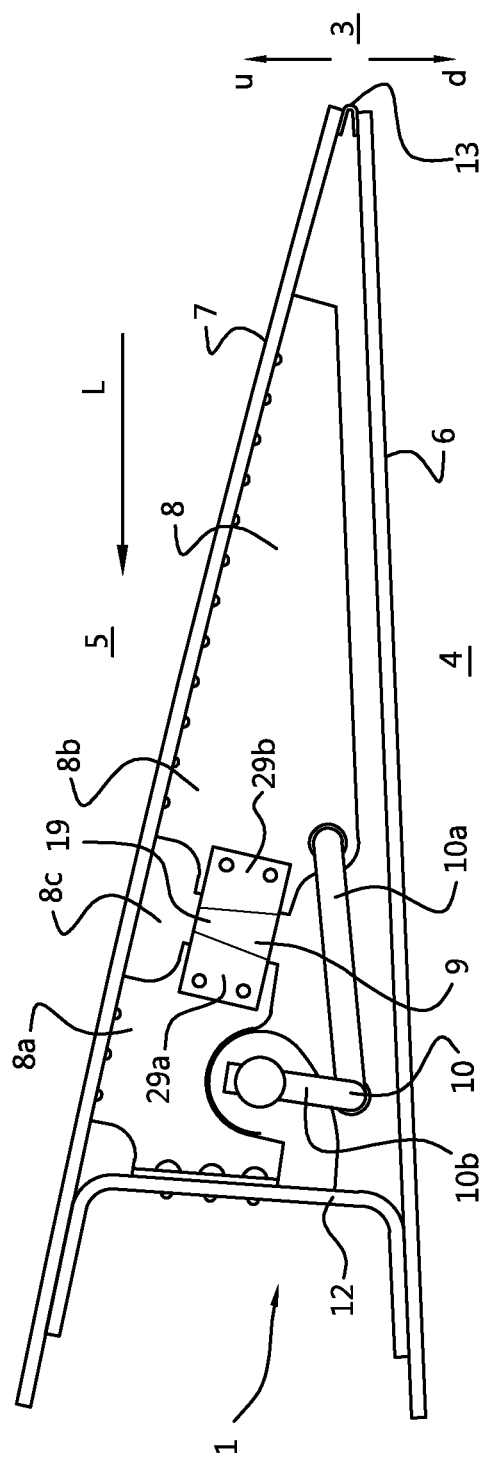
Figure 3:
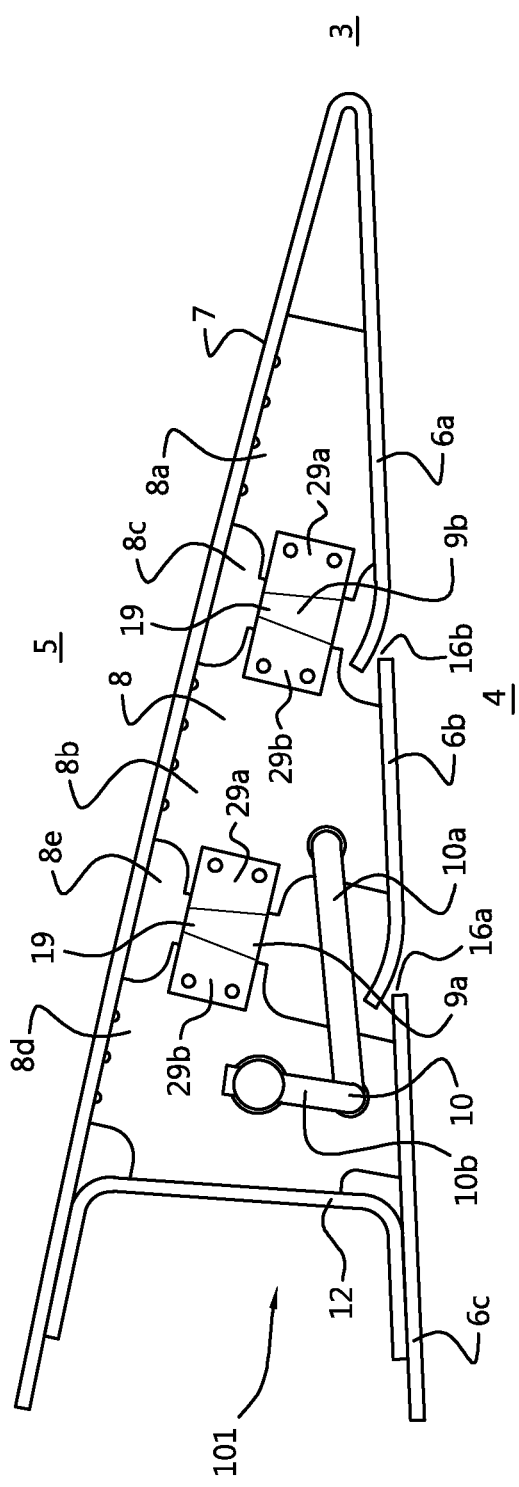

With reference to FIGS. 2 and 3, a first and second embodiment of the airfoil-shaped body 1, 101 according to the invention is described. Both embodiments will below be described in the context of an aircraft wing, wherein the body 1, 101 according to the invention is arranged near a trailing edge 3 of said aircraft wing. As such, a partial airfoil section is shown in FIGS. 2 and 3, in a chordwise direction of the aircraft wing. In the context of aircraft wings, beams that are arranged in the chordwise direction are usually called ribs and, therefore, that terminology is used below. Further, the first skin 7 will be referred to as upper skin, and the second skin 6 will be referred to as lower skin with reference to FIGS. 2 and 3.

It is noted however that the invention is not limited to aircraft wings. The body according to the invention may also be applied in for example turbine blades of wind turbines, in rotor blades of a helicopter, or any other airfoil-shaped surface that benefits from a variable outer shape.

FIG. 2 shows a first embodiment of the airfoil-shaped body 1 according to the invention. The body has a suction side 5 with a relatively low pressure, and a pressure side 4 with a relatively high pressure. The suction side 5 is defined by the upper skin 7 of the body, and the pressure side 4 is defined by the lower skin 6 of the body 1.

It is noted that, in FIG. 2, both the lower 6 and the upper 7 skin are substantially straight. In general, these surfaces will typically be curved or cambered, with the upper skin 7 having a substantially convex shape, i.e. having a positive curvature, and the shape of the lower skin 6 depending on the specific airfoil geometry, being either convex, concave, or having a more complex shape.

Arranged inside a cavity of the airfoil-shaped body 1 is an elongate stiffening rib 8. In FIG. 2, the rib 8 extends in the chordwise direction of the body and is secured to the upper skin 7 with a top side and a back spar 12 with a front side. The rib 8 provides stiffness to the upper skin 7 of the airfoil-shaped body 1. It is noted that the rib 8, in the shown cross-section, is only connected to the upper skin 7, and not to the lower skin 6.

The rib 8 includes a first 8a and a second 8b rib section. The rib sections 8a, 8b are arranged one after the other. In FIG. 2, the rib sections 8a, 8b are arranged substantially in line, wherein two facing end portions of the rib sections 8a, 8b are spaced apart, and a longitudinal gap 8c is present between them. This longitudinal gap 8c is partially bridged by a joining member 9, which is arranged between said facing end portions and is connected to both rib sections 8a, 8b. The joining member 9 does not bridge the whole gap 8c, such that a hollow portion of the body is present between the first 8a and second 8b rib sections, the joining member 9, and the upper skin 7. This hollow portion locally weakens the upper skin 7 in a direction transverse to the longitudinal direction L, such that the upper skin 7 is relatively flexible and can bend.

The joining member 9 is adapted to elastically deform, for example in the chordwise direction L of the stiffening rib, so as to allow a relative movement between the two rib sections 8a, 8b, such as at least a pivotal movement. The joining member 9 is preferably relatively stiff in a direction from the upper 7 to the lower 6 skin.

In the specific embodiment of FIG. 2, the joining member 9 comprises a tubular part 19 and opposite radial attachment flanges 29a, 29b. The tubular part 19 has a central axis that extends transverse to the chordwise direction L of the rib 8. In a specific embodiment, the central axis and the chordwise direction L may be perpendicular to each other. In an alternative embodiment, the central axis may be perpendicular to the upper 7 or the lower 6 skin. In the specific embodiment of FIG. 2, the tubular part 19 has a generally concave shape, with the end facing the upper skin 7 being narrower than the end facing the lower skin 6.

The opposite radial attachment flanges 29a, 29b each extend outwardly from opposite sides of the tubular part 19, and are each connected to a respective end portion of the first 8a and second 8b rib sections.

Further shown in FIG. 2 is an actuator 10. In the specific embodiment of FIG. 2, the actuator 10 comprises two hinge arms 10a, 10b, each hinge arm 10a, 10b being operationally associated with one rib section 8a, 8b of the elongate stiffening rib 8. It is noted that the hinge arm mechanism 10a, 10b shown in FIG. 2 is only one embodiment of many different actuation principles that are possible for the actuation of the rib sections 8a, 8b.

In use, upon operating the actuator 10, the first beam section is moved with respect of the second beam section, or vice versa, changing the orientation of the beam section with respect to each other. In the embodiment of FIG. 2, one of the two rib sections 8a, 8b is pivoted either upwards u or downward d with respect to the other of the rib sections 8a, 8b. This changes the orientation of the rib sections 8a, 8b with respect to each other and causes a change in the variable outer shape of the body 1. In particular, the curvature of the upper 7 and lower 6 skin can be changed by operating the actuator 10. This will be better understood with reference to FIG. 8, further below.

It is noted that both the upper skin 7 and the lower skin 6, in the embodiment of FIG. 2, are formed as one piece. This makes both skins 6, 7 relatively stiff, and relatively difficult to deform. To introduce some more flexibility in the body, the lower 6 and upper 7 skin are connected to a rubber element 13 at the trailing edge 3. The rubber element 13 allows the upper skin 7, up to a certain deflection angle, to deform independently from the lower skin 6, where the upper 7 and lower 6 skins are indirectly connected via a rubber element 13. This rubber element 13 easily deforms and can have many shapes, depending on the relative orientation of the first 8a and second 8b rib sections with respect to each other.

A second embodiment of the airfoil-shaped body 101 according to the invention is shown in FIG. 3. As both embodiments of FIGS. 2 and 3 relate to the same inventive concept, only the differences between FIGS. 2 and 3 will be highlighted below.

In the embodiment of FIG. 3, the elongate rib 8 comprises three, i.e. one further, rib sections 8a, 8b, 8d, and two, i.e. one further, joining members 9a, 9b. The first joining member 9a connects rib sections 8b and 8d, while the second joining member 9b connects the rib sections 8b and 8a.

In the embodiment shown in FIG. 3, the lower skin 6 is composed of multiple skin parts 6a, 6b, 6c in the longitudinal direction of the stiffening beam. The respective skin parts 6a, 6b, 6c are spaced apart by a slit 16a, 16b and are pivotable with respect to each other. The rib sections 8a, 8b, 8d are secured to both the upper skin 7 with one side thereof, and to the lower skin 6 with another, opposite, side thereof. Each of the multiple lower skin parts 6a, 6b, 6c is secured to one of said first 8a, or second 8b, or third 8d rib sections. The skin parts 6a, 6b, 6c are indirectly connected to each other via the respective rib sections 8a, 8b, 8d and the joining members 9b, 9a, allowing the skin parts 6a, 6b, 6c to pivot with respect to each other. Note that the slits 16a, 16b between the skin parts 6a, 6b, 6c are arranged in a zone where the joining members 9b, 9a are located.

Further with respect to FIG. 3, only one actuator 10 is shown, acting on the second 8b and the third 8d rib sections. In the embodiment shown in FIG. 3, only these rib sections 8d, 8b can therefore move, e.g. pivot, with respect to each other. It is well conceivable that a second actuator is arranged in the body, for example acting at least on the first rib section 8a, such as on the third 8d and first 8a rib sections, or on the second 8b and the first 8a rib sections. Alternatively, the actuator 10 may act on the third 8d and the first 8a rib sections.

Further visible in the embodiment of FIG. 3 is a closed trailing edge 3, i.e. the lower skin 6 and the upper skin 7 are formed as one part, with a locally closed cross-section. Because the trailing edge 3 is closed, it is relatively stiff. This is possible, as the flexibility that is required for the deformation of the body, is provided by the lower skin 6 that is built up out of multiple skin parts 6a, 6b, 6c.

FIGS. 9 and 10 show the body of FIG. 3, where it is incorporated in an airfoil profile, having a non-straight first 7 and second 6 skins. Note that the actuator is not shown in FIGS. 9 and 10.

FIG. 9 shows the body 101 arranged near a leading edge 2 of an airfoil section. The body 101 comprises three beam sections 8a, 8b, 8d, where the most rearwards (backwards) beam section 8d is connected to a front spar 22 of the airfoil section. The beam sections 8a, 8b, 8d are connected with joining member 9a, 9b, in a way similar to FIG. 3. Further visible in FIG. 9 are slits 16a, 16b that provide the required flexibility to allow a deformation of the body.

In FIG. 9, one possible deformed shape of the shown body 101 is indicated in dashed lines, corresponding to a downwards deflection. It is, for example, also conceivable that the body is deflected upwards, less downwards, or more downwards.

FIG. 10 shows the body 101 arranged near a trailing edge 3 of an airfoil section. The body 101 comprises three beam sections 8a, 8b, 8d, where the most rearwards beam section 8d is connected to a back spar 12 of the airfoil section. The beam sections 8a, 8b, 8d are connected with joining member 9a, 9b, in a way similar to FIG. 3. Further visible in FIG. 10 are slits 16a, 16b that provide the required flexibility to allow a deformation of the body.

In FIG. 10, one possible deformed shape of the shown body 101 is indicated in dashed lines, corresponding to a downwards deflection. It is, for example, also conceivable that the body is deflected upwards, less downwards, or more downwards.

Figure 1:
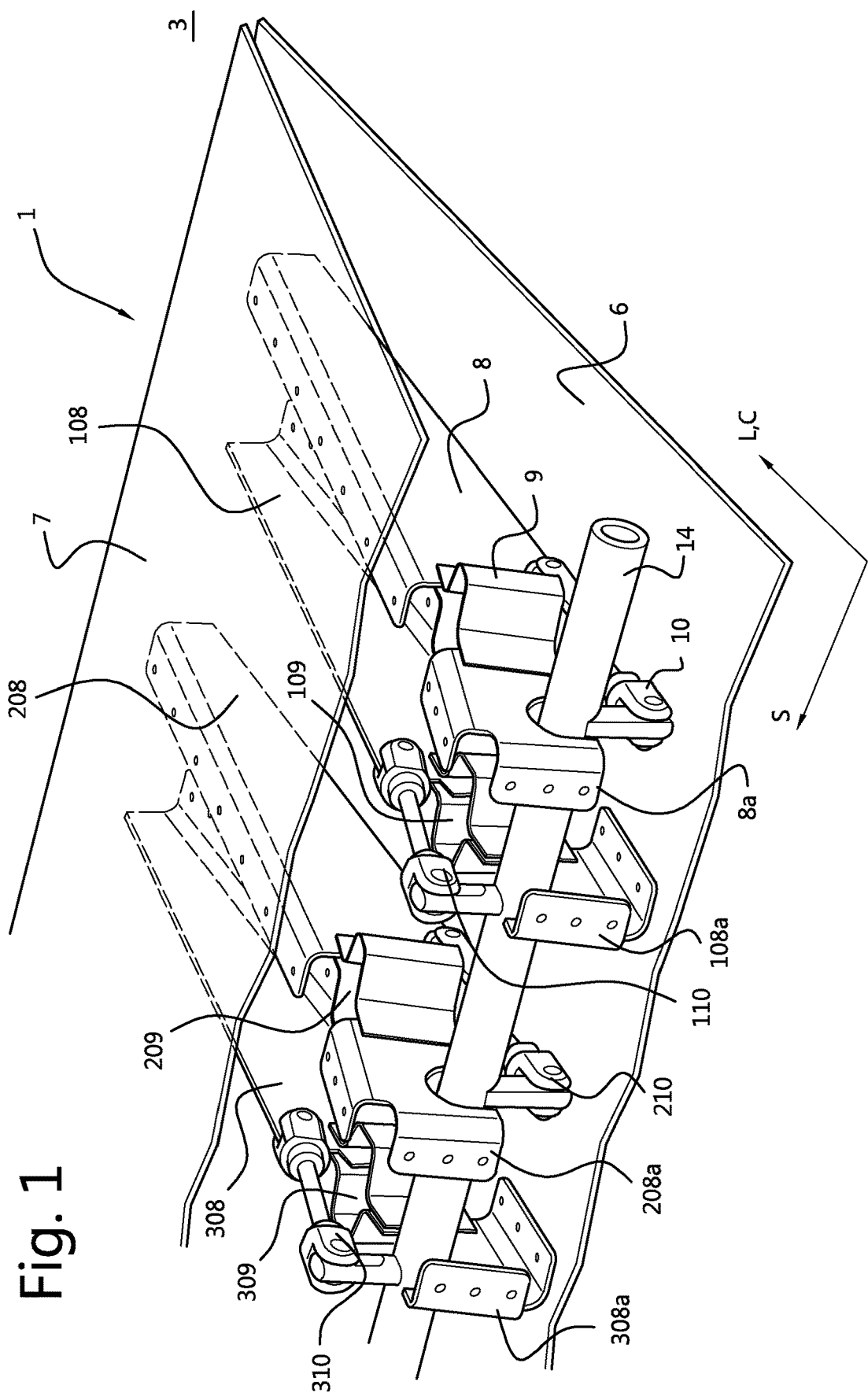
FIG. 1 schematically shows a part of an airfoil-shaped body, comprising multiple elongate stiffening beams, FIG. 2 schematically shows a detailed view of a first embodiment of an airfoil-shaped body according to the invention, FIG. 3 schematically shows a detailed view of a second embodiment of an airfoil-shaped body according to the invention, FIG. 4 schematically shows an assembly of a joining member, two beam sections, and a skin of the airfoil-shaped body according to the invention, FIG. 5 schematically shows an assembly of a joining member and two beam sections of the airfoil-shaped body according to the invention, in an undeformed state thereof, FIG. 6 schematically shows an assembly of a joining member and two beam sections of the airfoil-shaped body according to the invention, in a deformed state thereof, FIG. 7 schematically shows a cross-sectional view along a longitudinal direction of an assembly of a joining member and two beam sections of the airfoil-shaped body according to the invention, FIG. 8 schematically shows an airfoil-shaped body according to the invention, in an undeformed, and one possible deformed shape, FIG. 9 schematically shows an airfoil-shaped body according to the invention, arranged near a leading edge of an airfoil profile, FIG. 10 schematically shows an airfoil-shaped body according to the invention, arranged near a trailing edge of an airfoil profile, FIG. 11 schematically shows an airfoil-shaped body according to the invention, arranged near a wingtip of a wing, FIG. 12A schematically shows a skin, two beam sections, and a set of joining members of an airfoil-shaped body according to the invention, FIG. 12B schematically shows a further embodiment of the airfoil-shaped body according to the invention.

Shown in FIG. 1 is an airfoil-shaped body with multiple elongate stiffening beams 8, 108, 208, 308 and multiple joining members 9, 109, 209, 309. The airfoil-shaped body is for example an aircraft wing, where the elongate stiffening beams 8, 108, 208, 308 are arranged in a chordwise direction C, said chordwise direction C corresponding to the longitudinal direction L of the beams 8, 108, 208, 308. The beams 8, 108, 208, 308 are spaced at a distance from each other, when seen in the spanwise direction S of the wing, and extend substantially parallel to each other with a pitch of for example 150 mm-300 mm. Visible in FIG. 1 is that the leftmost beam 8 and the third beam 208 (when counted from the right of the figure) are only secured to the first skin 7, while the second 108 and rightmost 308 beams are only secured to the second skin 6, analogous to the embodiment of FIG. 2. As seen in FIG. 1, the first beam sections 8a, 108a, 208a, 308a of different stiffening beams 8, 108, 208, 308 are interconnected with a torque rod 14. The torque rod 14 and the actuators 10, 110, 210, 310 allow a simultaneous movement of the different stiffening beams 8, 108, 208, 308, and thus the shape variation of a spanwise wing section.

Figure 8:
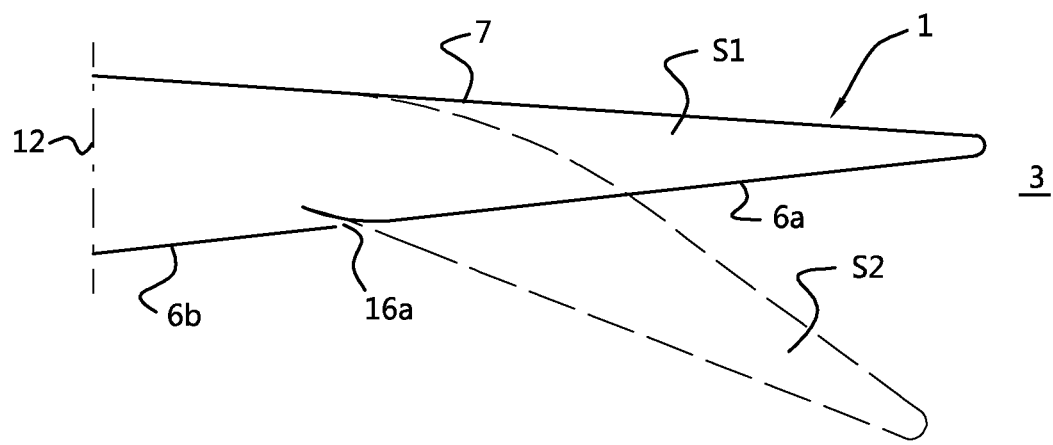

This varying shape is more clearly shown in FIG. 8, where an undeformed state S1 of the body 101 is shown in solid lines, and one possible deformed state S2 of the body 101 is shown in dashed lines. It will be appreciated by the person skilled in the art, that in principle infinitely many deformed shapes can be achieved with the body 101 of the invention. The deflection may e.g. be upwards or downwards, while a continuous range of deflection angles may be reached, i.e. in principle any deflection angle up to a maximum of approximately 20° per joining member.

As can be seen, the curvature of the first skin 7 is relatively gradual in the deformed state S2, in contrast to the second skin 6 where sharp corner is present near the slit 16a. Especially for the first skin 7, it is beneficial when the curvature is gradual, without any kinks, gaps, or sharp corners, as this reduces drag and postpones the angle of attack at which the airfoil-shaped body stalls. Preferably, the curvature introduced in the first skin has a radius of at least 150 mm, such as between 250 mm and 500 mm. It is noted that many conventional flap systems have a curvature of between 30 mm and 80 mm in their deflected position, introducing a much sharper bend in the first skin.

Figure 5:
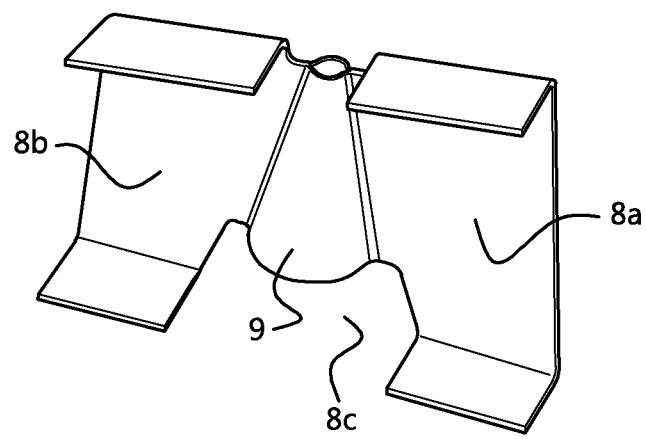
Figure 6:
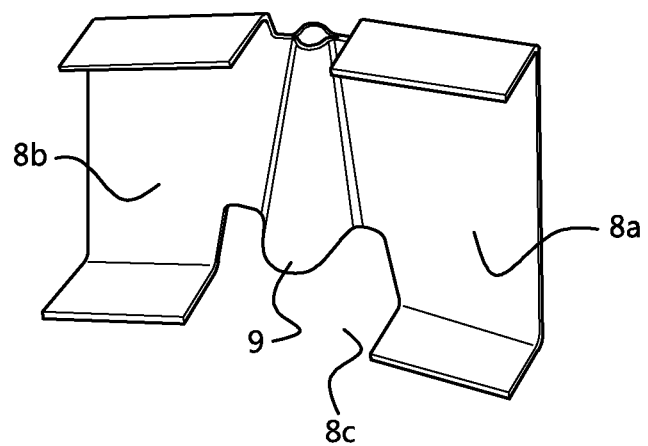

In FIGS. 5 and 6, a more detailed view of an assembly of the joining member 9 and the beam sections 8a, 8b is shown. In the embodiments of FIGS. 5 and 6, the joining member 9 and the beam sections 8a, 8b are formed as one piece, wherein the beam sections 8a, 8b are arranged one after the other and spaced apart by a longitudinal gap, wherein the joining member 9 is arranged in between end portions of the beam sections 8a, 8b and connected thereto. Visible in the embodiments of FIGS. 5 and 6, is that the joining member 9 has a hollow profile with a closed contour. Further visible in FIGS. 5 and 6, is that the joining member 9 comprises a tubular part, that has a rounded, more specifically an oval, cross-section.

FIG. 5 shows the assembly of joining member 9 and beam sections 8a, 8b in an undeformed state. In FIG. 6, the beam section 8b is pivoted with respect to beam section 8a. This is allowed by an elastic deformation of the joining member 9.

Figure 4:
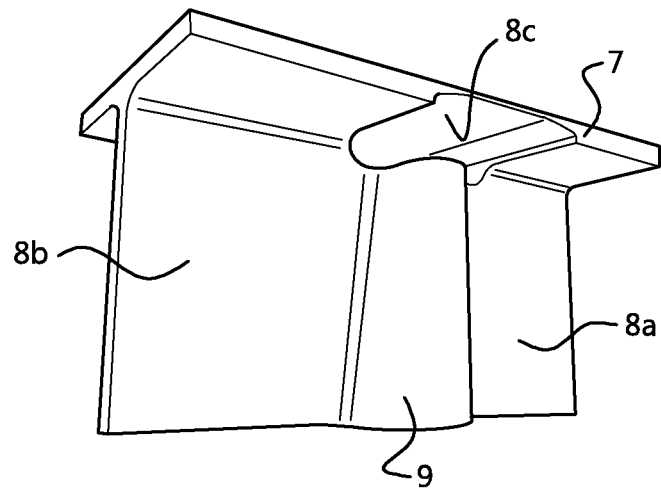

Visible in FIG. 4 is the assembly of FIGS. 5 and 6 when secured to a skin panel, in the embodiment of FIG. 4 the first skin 7. Present between the joining member 9, the first 8a and second 8b beam sections, and the first skin 7 is a gap 8c. Further visible is that the first skin 7 has a reduced thickness in the zone where the joining member 9 is located. In the embodiment of FIG. 4, the skin 7, the first beam section 8a, the second beam section 8b, and the joining member 9 are formed as one piece.

Figure 7:
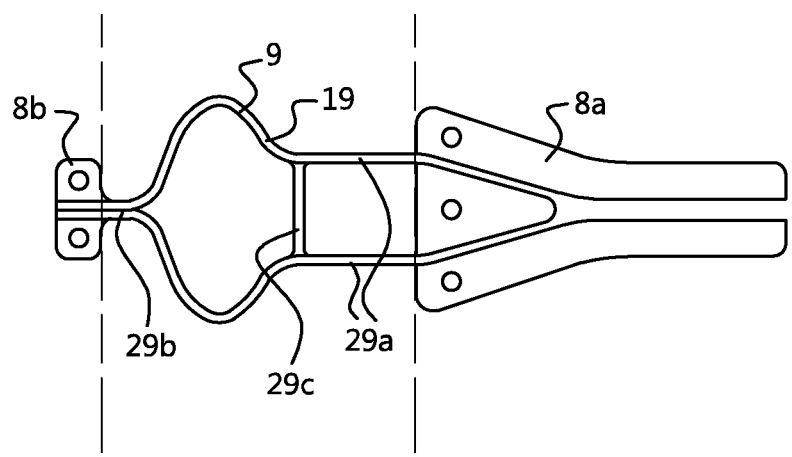

An alternative form of the joining member 9 is shown in FIG. 7, where a cross-section of a joining member 9, connected to beam sections 8a, 8b is shown. As can be seen, the joining member 9 of FIG. 7 has a partially tubular part 19, and opposite radial attachment flanges 29a, 29b extending outwardly from opposite sides of the partially tubular part 19. The flanges 29a, 29b are connected to the associated beam sections 8a, 8b. The flanges 29b adjoin, while the flanges 29a are spaced apart. The joining member 9 is reinforced with a bar 29c. The embodiment of FIG. 7 gives the joining member 9 a relatively large stiffness in a direction in and out of the paper, i.e. transverse to the first and second skin (not shown), while the joining member 9 is still able to elastically deform.

Preferably, the joining member 9, the elongate stiffening beam 8, and the skins 6, 7 are made from conventional materials, with conventional manufacturing techniques, and with conventional connection techniques.

More specifically, the joining member 9 should be made of a material that is suitable to be elastically deformed many times, without suffering from fatigue. The joining member 9 can for example be made from a thermoplastic composite fiber material, for example via injection moulding.

Also the beam sections 8a, 8b can be made from a thermoplastic composite fiber material. When both the joining member 9 and the beam sections 8a, 8b are made from a thermoplastic composite fiber material, it is relatively easy to connect the joining member 9 to the beam sections 8a, 8b. This can for example be achieved by welding the joining member 9 to the beam sections 8a, 8b, more specifically with resistance welding, injection welding, or ultrasonic welding. For cost reasons, the latter technique is preferred.

The beam sections 8a, 8b, can also be injection moulded. With a gap 8c, 8e present between the joining member 9, the beam sections 8a, 8b, 8d, and highly loaded skins 6, 7, stress concentrations will arise near said gap 8c, 8e. When the beam sections 8a, 8b are produced with an injection moulding technique, a relatively large freedom in shape can be achieved. This makes it possible to locally reinforce the flanges of the beam sections 8a, 8b near the gap 8c, 8e, reducing the stress concentrations in the material of the beam sections 8a, 8b.

When both the beam sections 8a, 8b, 8d and the joining members 9a, 9b are made of thermoplastic composite fiber material, for example via injection moulding, it is preferred that the used fibers in the joining members 9 are shorter than the used fibers in the beams sections 8a, 8b, 8d. This ensures that the joining member 9, compared to the beam sections 8a, 8b, is easily deformed.

FIG. 11 schematically shows an airfoil-shaped body, arranged in a spanwise direction of an aircraft wing. As such, FIG. 11 shows a fuselage 200, and an aircraft wing 201.

The aircraft wing 201 comprises a spar 8, including several spar sections 8a, 8b, 8d, 8f arranged in the spanwise direction of the wing 201. Seen in the spanwise direction, the tip of the wing can be deflected downwards (shown in dashed lines), or upwards (not shown).

Figure 12A:
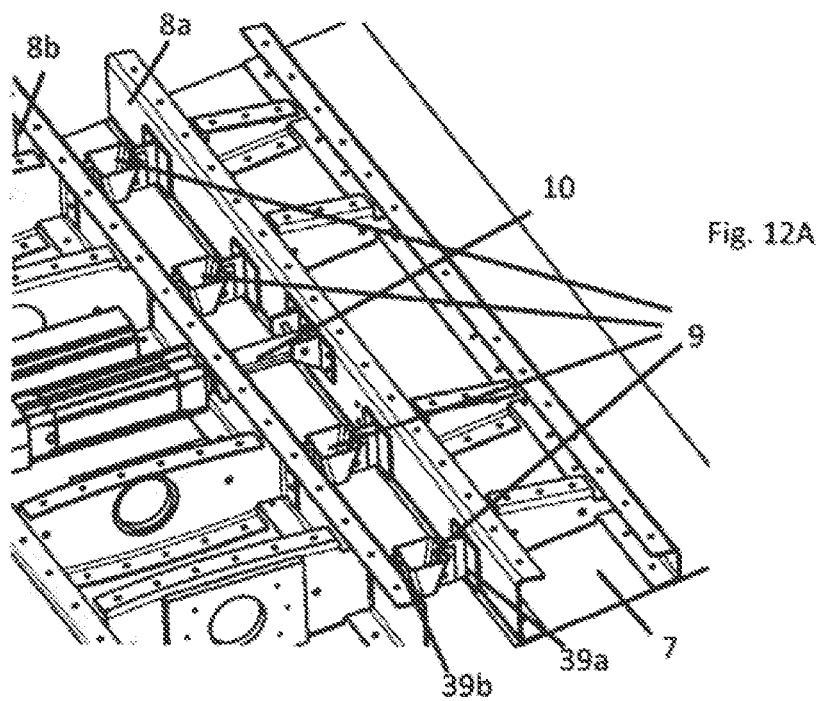
Figure 12B:
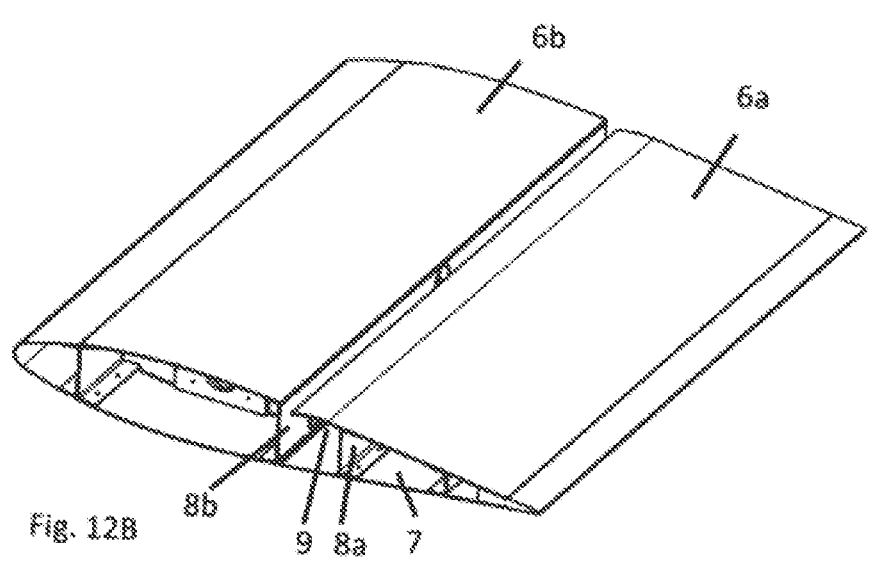

FIGS. 12A and 12B schematically shows a further embodiment of an airfoil-shaped body, wherein FIG. 12A only shows the first skin 7, while FIG. 12B shows both first skin 7 and second skin 6. Here, the beams 8a, 8b are arranged in a spanwise direction of the airfoil-shaped body 1 and spaced apart from each other. The beam sections 8a, 8b are arranged substantially parallel to each other, and spaced apart from each other in a chordwise direction of the airfoil-shaped body. As is especially visible in FIG. 12A, also in this embodiment the joining member 9 allows a change in the relative orientation of the beam sections 8a, 8b by an elastic deformation of the joining members 9.

As visible in FIG. 12A, the joining members 9 are here connected to T-shaped flanges 39a, 39b to allow a connection between the joining members 9 and the beam sections 8a, 8b. It is well conceivable that the joining members themselves have T-shaped attachment flanges.

Although individual embodiment of the invention have been discussed, the invention also includes combinations of those embodiments.

The invention claimed is:

1. An airfoil-shaped body having a variable outer shape, comprising:
    a first skin, defining a suction surface;
    a second skin, defining a pressure surface and connected to the first skin at least at a leading edge and/or a trailing edge of the airfoil-shaped body;
    at least two beam sections, arranged inside a cavity of the airfoil-shaped body and secured to at least one of said first and second skins, the beam sections being spaced apart from each other;
    a joining member, arranged between the at least two beam sections and connected thereto, said joining member being adapted to allow relative movement between the beam sections by an elastic deformation of the joining member; and
    an actuator that is operationally associated with said beam sections,
    wherein, upon operating the actuator, the first beam section is moved with respect to the second beam section, or vice versa, changing the orientation of the beam sections with respect to each other,
    which causes a change in the variable outer shape of the airfoil-shaped body.

2. The airfoil-shaped body according to claim 1, wherein the joining member comprises a hollow profile with a closed contour.

3. The airfoil-shaped body according to claim 1, wherein the joining member comprises a tubular part with a central axis extending perpendicular to the longitudinal direction of the beam sections.

4. The airfoil-shaped body according to claim 3, wherein the tubular part has opposite radial attachment flanges which extend outwardly from opposite sides of the tubular part to connect the joining member to the beam sections, the opposite radial attachment flanges defining a longitudinal direction of the joining member.

5. The airfoil-shaped body according to at least the claim 4, wherein the two beam sections are arranged one after the other and define an elongate stiffening beam, wherein the joining member is arranged between end portions of the beam sections, and wherein the attachment flanges of the joining member are each connected to a respective end portion of the first and second beam sections.

6. The airfoil-shaped body according to claim 3, wherein the tubular part of the joining member has a conical shape.

7. The airfoil-shaped body according to claim 6, wherein the tubular part is narrower at its end facing the first skin than at its end facing the second skin.

8. The airfoil-shaped body according to claim 3, wherein the tubular part has a round or polygonal cross section.

9. The airfoil-shaped body according to claim 1, wherein the joining member is stiff in a direction from the first to the second skin.

10. The airfoil-shaped body according to claim 1, wherein the beam sections are arranged in a spanwise direction of the airfoil-shaped body, parallel to each other, and spaced apart from each other in a chordwise direction of the airfoil-shaped body.

11. The airfoil-shaped body according to claim 1, wherein the two beam sections are arranged one after the other and define an elongate stiffening beam, wherein the joining member is arranged between end portions of the beam sections.

12. The airfoil-shaped body according to claim 11, wherein the beam sections are arranged in line, either in a chordwise or in a spanwise direction of the airfoil-shaped body.

13. The airfoil-shaped body according to claim 11, wherein the airfoil-shaped body comprises multiple spaced apart elongate stiffening beams extending parallel to each other, wherein at least the first beam sections of different stiffening beams are interconnected or the second beam sections of different stiffening beams are interconnected.

14. The airfoil-shaped body according to claim 11, wherein the elongate stiffening beam comprises at least one further beam section and at least one further joining member.

15. Airfoil-shaped body according to claim 1, wherein the beam sections are arranged perpendicular to each other, one of the two beam sections being arranged in the chordwise direction, the other of the two beam sections being arranged in the spanwise direction.

16. The airfoil-shaped body according to claim 1, wherein the movement of the first beam section with respect to the second beam section includes at least a pivotal movement.

17. The airfoil-shaped body according to claim 1, wherein the curvature introduced in the first and/or second skin has a radius of at least 150 mm.

18. The airfoil-shaped body according to claim 1, wherein the first skin is formed as one piece.

19. The airfoil-shaped body according to claim 1, wherein the second skin is composed of multiple skin parts, the skin parts being spaced apart by a slit and being pivotable with respect to each other, wherein each of said multiple skin parts is secured to one of said first or second beam sections, wherein the multiple skin parts are indirectly connected to each other via the respective beam sections and the joining member, and wherein the slit is arranged in a zone where the joining member is located.

20. The airfoil-shaped body according to claim 1, wherein the joining member is made from a thermoplastic composite fiber material, wherein the beam sections are made of a thermoplastic composite fiber material, and wherein the composite fiber material of the joining member contains fibres which are shorter than fibres of the composite fiber material of the associated beam sections.

* * * * *

UNITED STATES PATENT AND TRADEMARK OFFICE
CERTIFICATE OF CORRECTION

| | | |
|---|---|---|
| PATENT NO. | : 11,254,411 B2 | Page 1 of 1 |
| APPLICATION NO. | : 16/492905 | |
| DATED | : February 22, 2022 | |
| INVENTOR(S) | : Adrianus Marinus Franciscus | |

It is certified that error appears in the above-identified patent and that said Letters Patent is hereby corrected as shown below:

On the Title Page

In Column 1, item (72), the Inventor's city:
"Breada (NL)" should read --Breda (NL)--.

Signed and Sealed this
Eleventh Day of June, 2024

*Katherine Kelly Vidal*

Katherine Kelly Vidal
*Director of the United States Patent and Trademark Office*